(12) United States Patent
Chai et al.

(10) Patent No.: US 12,423,913 B2
(45) Date of Patent: Sep. 23, 2025

(54) INVERTIBLE NEURAL SKINNING

(71) Applicants: Menglei Chai, Los Angeles, CA (US); Riza Alp Guler, London (GB); Yash Mukund Kant, Toronto (CA); Jian Ren, Hermosa Beach, CA (US); Aliaksandr Siarohin, Los Angeles, CA (US); Sergey Tulyakov, Santa Monica, CA (US)

(72) Inventors: Menglei Chai, Los Angeles, CA (US); Riza Alp Guler, London (GB); Yash Mukund Kant, Toronto (CA); Jian Ren, Hermosa Beach, CA (US); Aliaksandr Siarohin, Los Angeles, CA (US); Sergey Tulyakov, Santa Monica, CA (US)

(73) Assignee: Snap Inc., Santa Monica, CA (US)

( * ) Notice: Subject to any disclaimer, the term of this patent is extended or adjusted under 35 U.S.C. 154(b) by 350 days.

(21) Appl. No.: 18/090,724

(22) Filed: Dec. 29, 2022

(65) Prior Publication Data

US 2024/0221314 A1 Jul. 4, 2024

(51) Int. Cl.
| | |
|---|---|
| *G06T 17/20* | (2006.01) |
| *G06F 3/01* | (2006.01) |
| *G06N 3/04* | (2023.01) |
| *G06T 13/20* | (2011.01) |

(52) U.S. Cl.
CPC .............. *G06T 17/20* (2013.01); *G06F 3/011* (2013.01); *G06N 3/04* (2013.01); *G06T 13/20* (2013.01)

(58) Field of Classification Search
CPC ......... G06T 17/20; G06T 13/20; G06T 13/40; G06N 3/04; G06F 3/011
See application file for complete search history.

(56) References Cited

U.S. PATENT DOCUMENTS

| | | | |
|---|---|---|---|
| 2014/0168270 A1* | 6/2014 | Choy .................. | G06T 3/18 345/647 |
| 2020/0058137 A1* | 2/2020 | Pujades .............. | G06V 40/23 |
| 2021/0201551 A1* | 7/2021 | Wedig ................ | G06T 13/40 |

(Continued)

OTHER PUBLICATIONS

International Search Report and Written Opinion for International Application No. PCT/US2023/086031, dated May 3, 2024 (May 3, 2024)—10 pages.

(Continued)

*Primary Examiner* — Phi Hoang
(74) *Attorney, Agent, or Firm* — CM Law; Stephen J. Weed

(57) ABSTRACT

Invertible Neural Networks (INNs) are used to build an Invertible Neural Skinning (INS) pipeline for reposing characters during animation. A Pose-conditioned Invertible Network (PIN) is built to learn pose-conditioned deformations. The end-to-end Invertible Neural Skinning (INS) pipeline is produced by placing two PINs around a differentiable Linear Blend Skinning (LBS) module using a pose-free canonical representation. The PINs help capture the non-linear surface deformations of clothes across poses and alleviate the volume loss suffered from the LBS operation. Since the canonical representation remains pose-free, the expensive mesh extraction is performed exactly once, and the mesh is reposed by warping it with the learned LBS during an inverse pass through the INS pipeline.

9 Claims, 8 Drawing Sheets

(56) References Cited

U.S. PATENT DOCUMENTS

| | | | | |
|---|---|---|---|---|
| 2022/0139058 | A1* | 5/2022 | Santesteban | G06N 3/044 |
| | | | | 345/419 |
| 2022/0261599 | A1* | 8/2022 | Kastaniotis | G06N 3/04 |
| 2022/0262073 | A1* | 8/2022 | Bailey | G06T 19/20 |
| 2023/0256340 | A1* | 8/2023 | Nishimura | G06N 3/0464 |
| | | | | 463/31 |
| 2023/0267666 | A1* | 8/2023 | Minor | G06N 3/04 |
| | | | | 345/419 |
| 2024/0005585 | A1* | 1/2024 | Fisher | G06V 10/763 |
| 2024/0144568 | A1* | 5/2024 | Gururani | G06V 10/82 |
| 2024/0169635 | A1* | 5/2024 | Singh | G06V 10/82 |

OTHER PUBLICATIONS

Kant Yash et al: "Invertible Neural Skinning", 2023 IEEE/CVF Conference on Computer Vision and Pattern Recognition (CVPR), IEEE, Jun. 17, 2023 (Jun. 17, 2023), pp. 8715-8725.

Loper Matthew et al: "SMPL", ACM Transactions on Graphics, ACM, NY, US, vol. 34, No. 6, Oct. 26, 2015 (Oct. 26, 2015), pp. 1-16.

Xu Chen et al: "Fast-SNARF: A Fast Deformer for Articulated Neural Fields", arxiv.org, Cornell University Library, 201 Olin Library Cornell University Ithaca, NY 14853, Dec. 2022 (Dec. 2022).

Xu Chen et al: "SNARF: Differentiable Forward Skinning for Animating Non-Rigid Neural Implicit Shapes", arxiv.org, Cornell University Library, 201 Olin Library Cornell University Ithaca, NY 14853, Oct. 11, 2021 (Oct. 11, 2021).

\* cited by examiner

INVERTIBLE NEURAL SKINNING

TECHNICAL FIELD

Examples set forth herein generally relate to animation of three-dimensional (3D) objects and, in particular, to methods and systems for animating 3D meshes of deformable objects by extending linear blend skinning with invertible neural networks.

BACKGROUND

Being able to generate animatable representations of clothed humans beyond skinned meshes is useful for building realistic augmented or virtual reality experiences and improving simulators. Prior art in this area has seen a shift from building parametric models of humans to more recent art that learns implicit 3D neural representations from data in canonical space. The prior art canonical representations are animated to a new pose by learning a skinning weight field around them and applying Linear Blend Skinning (LBS) or skeletal animation to deform a character's skin represented as a deformable mesh model by following the motion of an underlying abstract skeleton, where the pose is defined by a bone skeleton underlying the 3D surface of the character's skin.

Parametric models usually define the correspondences between poses, represented as a set of bones, and mesh vertices through LBS weights. These weights provide a soft assignment of vertices to human bones. Thus, for animation, these models transform the vertices using a linear combination of bone transformations. When the parametric model is not available, these weights need to be discovered. To this end, recent prior art has adopted learning-based solutions for discovering LBS weights. They usually assume a shared canonical space and learn a canonical LBS weight field, which is used for deforming the body in the novel pose during inference. However, at training time, the character needs to be warped backward from deformed to canonical space (i.e., given deformed points, the corresponding canonical points need to be obtained). Thus, some prior art approaches learn LBS weights separately in deformed and canonical spaces, which could be used for establishing correspondences. These approaches generally require cycle-consistency losses for regularization. Recently, using differentiable forward skinning for animating non-rigid neural implicit shapes, differential forward skinning for animating non-rigid neural implicit shapes (SNARF) computed these correspondences by finding the solutions of the LBS equation using an iterative solver.

A significant amount of prior art for building parametric representations of the human body or for specific parts such as hands and faces also has been developed. Beyond humans, recent art has developed parametric animal models. Some prior art has explored building implicit human representations with and without clothing. However, representing characters as implicit functions comes with a cost of time-consuming mesh extraction via Marching Cubes.

BRIEF DESCRIPTION OF THE DRAWINGS

In the drawings, which are not necessarily drawn to scale, like numerals may describe similar components in different views. Some nonlimiting examples are illustrated in the figures of the accompanying drawings in which.

DETAILED DESCRIPTION

Figure 1:
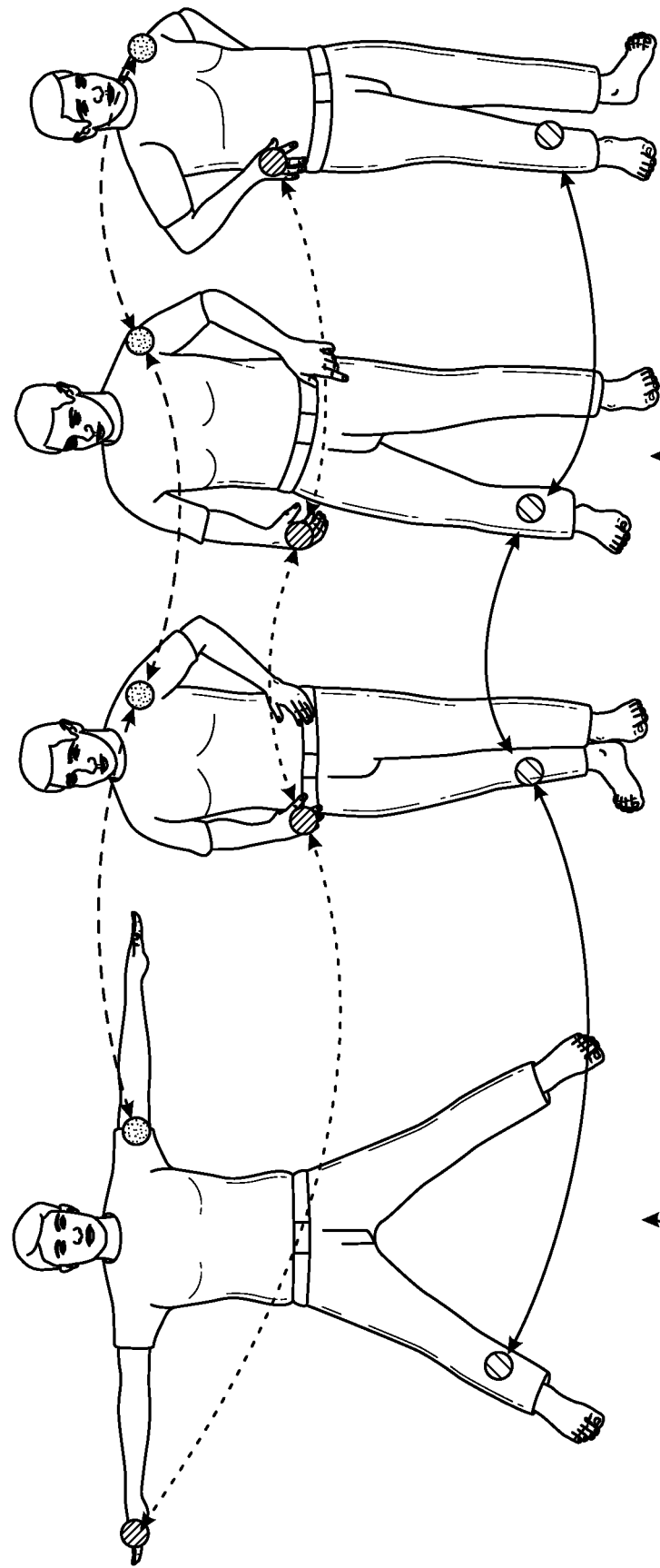
FIG. 1 is an illustration depicting bidirectional correspondences of a canonical representation of a dressed human in a deformed space using fast and invertible posing.

A Pose-conditioned Invertible Network (PIN) architecture extends the pure LBS process by learning additional pose-varying deformations using a pose-free canonical representation. PIN is also combined with a differentiable LBS module to build an expressive and end-to-end learnable reposing Invertible Neural Skinning (INS) pipeline that addresses shortcomings in the prior art by allowing the animation of implicit surfaces (e.g., 3D meshes using bones) with intricate pose-varying effects, without requiring mesh extraction for each pose, while also maintaining correspondences across poses. The described INS network is shown to rectify artefacts introduced by LBS.

The subject matter described herein uses Invertible Neural Networks (INNs), which are bijective functions that can preserve exact correspondences between their input and output spaces, while learning complex non-linear transforms between them. This ability of INNs makes them a suitable candidate for reposing. INNs are leveraged herein to build an Invertible Neural Skinning (INS) pipeline. For this, a Pose-conditioned Invertible Network (PIN) is built to learn pose-conditioned deformations. To produce an end-to-end Invertible Neural Skinning (INS) pipeline, two PINs are placed around a differentiable LBS module using a pose-free canonical representation. These PINs help capture the non-linear surface deformations of clothes across poses and alleviate the volume loss suffered from the LBS operation. Since the canonical representation remains pose-free, the expensive mesh extraction is performed exactly once, and the mesh is reposed by warping it with the learned LBS during an inverse pass through the INS pipeline.

The present disclosure provides methods and instructions on computer readable media to implement methods of animating a three-dimensional (3D) mesh of a deformable object using an invertible neural skinning (INS) pipeline. The method includes receiving, by a first Pose-conditioned Invertible Network (PIN), a given pose of the deformable object defined by a generic set of bones as input and mapping, by the first PIN, canonical points of the deformable object in a pose-independent canonical space to points in a pose-dependent canonical space. The points in the pose-dependent canonical space are transformed by a differentiable Linear Blend Skinning (LBS) network to deformed points in novel poses of the deformable object. A second PIN performs error correction of the deformed points in a deformed space. The method further includes extracting the mesh of the deformable object from a pose-free canonical occupancy network or a neural representation to obtain the mesh of the deformable object in the pose-independent canonical space. Mesh vertices of the extracted mesh of the deformable object may be reposed using the generic set of bones via a pass through the first PIN, the differential LBS network, and the second PIN. The mesh of the deformable object is extracted once for different poses and the reposing of the extracted mesh includes warping it with the differential LBS network.

The method further includes chaining together one-dimensional (1D) and two-dimensional (2D) pose-conditioned coupling layers of an invertible neural network (INN) to form the first and second PINS. In example configurations, the first and second PINS are invertible to preserve exact correspondences between inputs and outputs.

The method may further include encoding every bone transform in the given pose of the deformable object using an operation map that takes a six-dimensional (6D) input of concatenated three-dimensional (3D) translation and rotation and obtaining pose embedding by concatenating outputs of each bone.

The INS pipeline may be trained by receiving, by the second PIN, input scans of the deformable object in different poses in the deformed space, providing, by the second PIN, poses corresponding to the input scans, obtaining, by the differentiable LBS network, pose correspondences to the canonical points in the pose-independent canonical space from the given pose, and mapping, by the first PIN, the points in the pose-dependent canonical space to canonical points in the pose-independent canonical space and passing the canonical points in the pose-independent canonical space to a pose-free occupancy network.

The invertible neural skinning (INS) pipeline for animating a three-dimensional (3D) mesh of a deformable object in an example configuration includes a first Pose-conditioned Invertible Network (PIN) that receives a given pose of the deformable object defined by a generic set of bones as input and maps canonical points of the deformable object in a pose-independent canonical space to points in a pose-dependent canonical space, a differentiable Linear Blend Skinning (LBS) network that receives the points in the pose-dependent canonical space and transforms the points to obtain deformed points in novel poses of the deformable object, and a second PIN that receives the novel poses of the deformable object and performs an error correction of the deformed points in a deformed space.

The INS pipeline may further include a pose-free canonical occupancy network or a neural representation from which the mesh of the deformable object is extracted to obtain the mesh in the pose-independent canonical space. Mesh vertices of the mesh extracted from the canonical occupancy network may be reposed using the generic set of bones via a pass through the first PIN, the differential LBS network, and the second PIN. The mesh is extracted once for different poses and the extracted mesh is reposed by warping it with the differential LBS network.

In example configurations, the first and second PINS are invertible to preserve exact correspondences between inputs and outputs, and the first and second PINS each include one-dimensional (1D) and two-dimensional (2D) pose-conditioned coupling layers of an invertible neural network (INN) that are chained together.

A detailed description of the methodology for animating 3D meshes of deformable objects will now be described with reference to FIGS. 1-7. Although this description provides a detailed description of possible implementations, it should be noted that these details are intended to be exemplary and in no way delimit the scope of the inventive subject matter.

Invertible Neural Networks (INNs) were initially designed for tractable density estimation of high-dimensional and generative modeling, a.k.a. normalizing flows. Usually, INNs are built by chaining together multiple conditional coupling layers, where a single coupling layer defines an invertible transformation between its input and output. The main idea behind coupling layers is that if the input is split into two parts and only the first part is modified while conditioning the modification on the second, the input should be trivially invertible. Another popular type of invertible transformations are invertible residual layers with small conditioning numbers. They utilize fixed point iterations for finding an inverse. However, the present disclosure mostly relies on coupling layers since they are faster. In the context of 3D vision, INNs have been used for learning primitives of 3D representations, doing 3D shape-completion tasks, and reconstructing dynamic scenes. The present disclosure extends the use of INNs to animating 3D characters.

The systems and methods described herein learn a human 3D representation that allows the generation of novel poses beyond original training data (a.k.a. reposing). For each subject, the availability of N pairs consisting of bone poses and 3D meshes denoted as $(\theta^t, M^t)_{t=1}^{N}$ are assumed. Such data can be obtained from human scans, and the poses can be estimated by fitting a parametric SMPL-like body model to these scans. Given this data, subject-specific implicit neural representation in a canonical space and a method to animate this representation are learned.

FIG. 1 illustrates bidirectional correspondences of a canonical representation in canonical space 100 of a dressed human and the dressed human in a deformed (bidirectional correspondence) space 110 as obtained using fast and invertible posing. An input point in deformed space 110 is denoted as $p_d^t \in \mathbb{R}^3$ and a point in the canonical space 100 is denoted as $p_c \in \mathbb{R}^3$. Since the input consists of a sequence of deformed (posed) meshes, the superscript t is used to indicate the time-step of capture. As the canonical space 100 is independent of the pose, it is shared across all the time steps. Thus, $p_c$ is not time-indexed.

To identify the deformed and canonical poses, the skinned multi-person linear model (SMPL) model is followed, which represents body pose as a set of bones in a kinematic tree. While reposing, as only the relative pose between canonical and deformed space 110 is needed at any given time t, the reposing is represented by $\theta^t = [B_1, \ldots, B_{nb}]$, where $B_i = [R_i | t_i]$ represents a transformation of the $i^{th}$ bone in 3D space, i.e., $B_i \in SE(3)$ with corresponding rotation $R_i \in \mathbb{R}^{3 \times 3}$ and translation $t_i \in \mathbb{R}^2$. The total number of bones is denoted by $n_b$.

To represent a specific subject, an Occupancy Network O is used that is conditioned solely on the input point $p_c$ to provide pose-free canonical occupancy. The canonical surface $S_c$ is then represented implicitly as a level-set ($\sigma = 0.5$) of this occupancy network:

$$S_c = \{p_c \mid O(p_c) = \sigma\} \text{ and } O: \mathbb{R}^3 \to [0, 1]. \quad (1)$$

To extract this canonical iso-surface as a mesh, the MISE algorithm is used. This is different from prior art approaches that use additional pose-conditioning in the canonical occupancy network.

For both training and evaluation of INS, 3D points are sampled in deformed space 110 and their ground-truth occupancy values of zero or one are obtained based on whether they lie outside of the mesh (scan).

Differentiable Forward Blend Skinning

To animate the subject from their canonical to deformed pose, Linear Blend Skinning (LBS) is used. LBS involves deforming the canonical surface according to a convex combination of rigid bone transforms. Specifically, the differentiable LBS formulation from SNARF is used, as summarized below.

A learnable weight field in canonical space 100 is defined and parameterized by a neural network, $w_{lbs}: \mathbb{R}^3 \to \mathbb{R}^{nb}$. For a given point in canonical space 100, this weight field predicts the blend weights corresponding to each bone:

$$w_{lbs}(p_c) = [w_1, \ldots, w_{nb}] \text{ and } w_i \in \mathbb{R}. \quad (2)$$

To make weights ($w_i$) convex for LBS, they are constrained to be always non-negative and sum to 1 using softmax.

Given the above weight field and the relative body pose as bone transforms $\theta^r = [B_1, \ldots, B_{nb}]$, any point $p_c$ of the canonical space 100 can be forward warped to deformed space 110 using LBS as follows:

$$p_d^t = \text{lbs}(w_{lbs}, p_c) = \left[\sum_{i=1}^{n_b} w_{lbs,i}(p_c) \cdot B_i\right] \cdot p_c, \quad (3)$$

where $p_d^t$ represents the corresponding point in deformed space 110 where $p_c$ lands after LBS.

Canonical correspondences may be searched. While training on raw scans, only points in deformed space 110 are provided. To find their possible correspondences in canonical space 100, the roots of Equation (3) are solved using an iterative solver while keeping $w_{lbs}$ constant. Specifically, Broyden's Method is used to find a set of $\{p_c^1, \ldots, p_c^K\}$ point correspondences for each deformed point $p_d^t$ by initializing the root-finding algorithm at K different points in the canonical space 100 as follows:

$$\{p_c^1, \ldots, p_c^K\} = broy(w_{lbs}, \theta^r, p_d^t). \quad (4)$$

The above formulation is end-to-end differentiable as it is possible to compute the gradients of the weight field $w_{lbs}$ with respect to input point $p_d^t$ via implicit differentiation as shown in SNARF. These derivations are also extended below to compute the gradient of correspondences $p_c^i$ with respect to input points.

The above differentiable formulation suffers from the same limitations of traditional LBS, such as being unable to represent the clothed surfaces, and introducing volume loss. For example, SNARF struggles to represent finer details such as cloth wrinkles, while SNARF-NC struggles with LBS artefacts such as volume loss and candy-wrapper effects. This is especially problematic when learning from real-world data of clothed humans in various poses.

Pose-Conditioned Invertible Network (PIN)

As noted above, invertible neural networks are bijective functions composed of modular components called coupling layers, which preserve one-to-one correspondences between their input and output. The construction of a proposed pose-conditioned coupling layer is described below that is chained together to construct a PIN.

Figure 2:
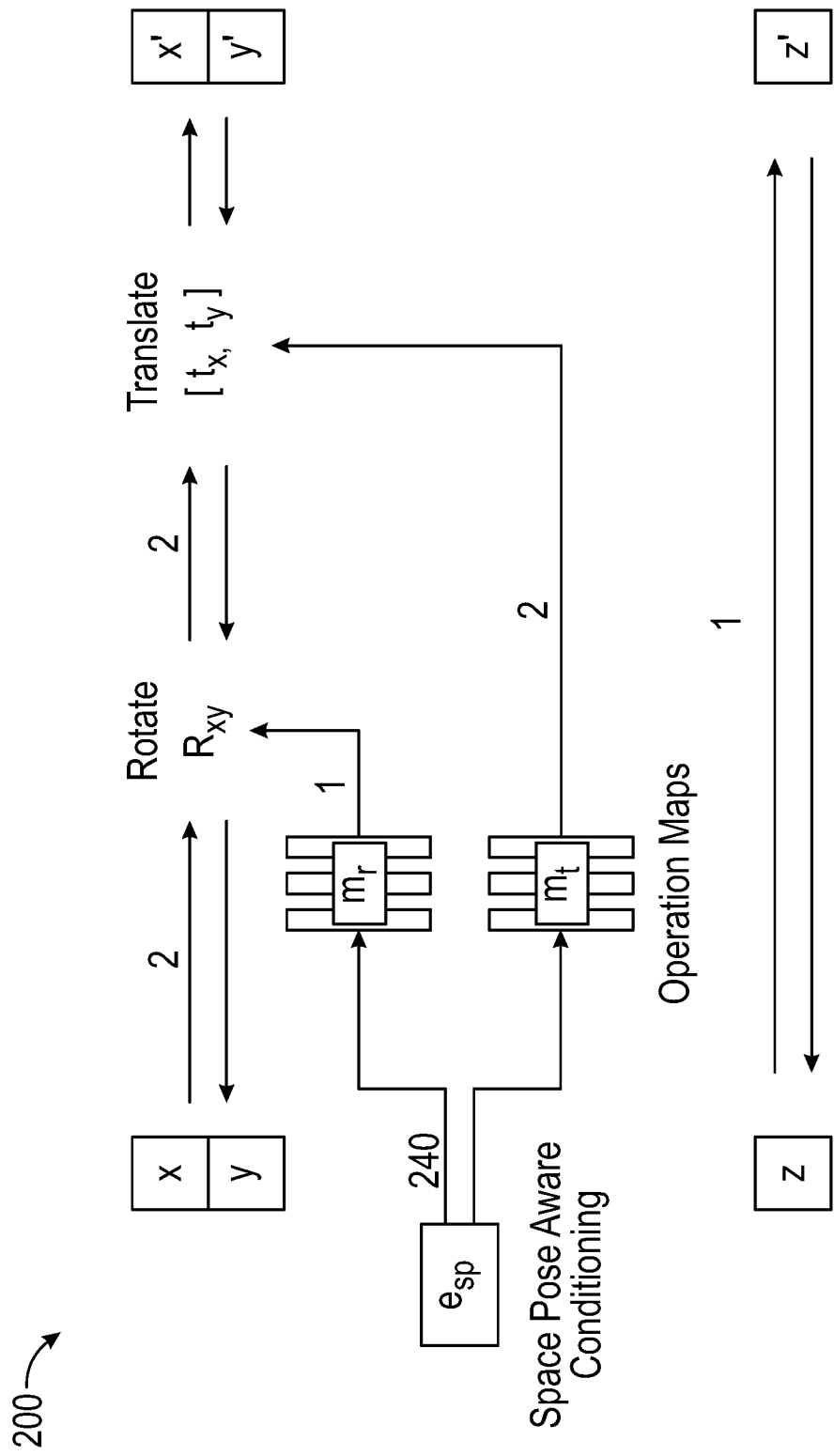
FIG. 2 is an illustration depicting a pose-conditioned 2D coupling layer of an invertible neural network (INN) in an example configuration.

FIG. 2 is an illustration depicting a pose-conditioned 2D coupling layer of an invertible neural network (INN) 200 in an example configuration. The space-pose conditioning is used to predict the operation parameters using two operation maps in the form of multilayer perceptrons (MLPs) $m_r$ and $m_t$, and the MLPs are used to rotate ($R_{xy}$) and translate ($[t_x, t_y]$) the input split $[x, y]$. In this case, $[z]$ remains unchanged.

A coupling layer operates by splitting its input into two parts using a fixed breaking pattern. In FIG. 2, the numbers "1" and "2" represent the dimensionality of the vectors. As shown in FIG. 2, after splitting, the first part of the input (e.g., $[x, y]$) is transformed by applying a sequence of invertible operations, such as translation and rotation. The parameters for these operations can be produced by an arbitrary function that is jointly conditioned on the second part of the input (e.g., $z$) and an external conditioning, such as pose.

Formally, as the system operates in 3D space, the input point can be defined as $[x,y,z]$, and the input splits as $[x, y]$ and $[z]$. Then, the 2D coupling layer $G^{xy}([x,y,z], \theta^r)$ defines an invertible transformation as follows:

$$[x', y'] = R_{xy}[x, y]^T + [t_x, t_y] \text{ and } z' = z, \quad (5)$$

where $R_{xy} \in \mathbb{R}^{2 \times 2}$, and $[t_x, t_y] \in \mathbb{R}^2$ is a rotation matrix and translation vector produced by an arbitrary function that takes as input only the bone pose $\theta^r$ and the coordinate $z$. The inverse $G_{xy}^{-1}([x, y, z], \theta^r)$ of the coupling layer can be computed as:

$$[x, y] = R_{xy}^{-1}([x', y'] - [t_x, t_y]) \text{ and } z = z'. \quad (6)$$

The computation of operation parameters $R_{xy}$ and $[t_x, t_y]$ will now be described.

Every bone transform in pose $\theta^r$ is encoded using a MLP $m_b$ that takes a 6D input of concatenated 3D translation and rotation (as Euler angles). To obtain pose embedding, the outputs of each bone ee are concatenated as follows:

$$m_b: \mathbb{R}^6 \to \mathbb{R}^{d/nb} \text{ and } e_\theta := concat[m_b(B_i)]_{i=1}^{nb}. \quad (7)$$

A learned and periodic positional encoding (e.g., a simple neural network architecture for implicit neural representations that uses a sine as a periodic activation function (SIREN)) may be used to map the spatial coordinates as:

$$e_z := \Phi(z): \mathbb{R}^1 \to \mathbb{R}^d. \quad (8)$$

Such an encoding helps to better represent high-frequency surface details such as cloth wrinkles.

When the relative pose $\theta^t$ between deformed and canonical spaces is zero (i.e., $B_i=[I|0]$, all bone transforms have identity rotation and zero translation), the coupling layer should not introduce any space-varying (i.e., z-conditioned) changes. To enforce this, the Hadamard product of the space and pose embeddings may be performed for space and pose aware conditioning and subsequently concatenated to obtain:

$$e_{sp} := concat[e_\theta \odot e_z, e_\theta] \in \mathbb{R}^{2d}. \qquad (9)$$

Figure 3:
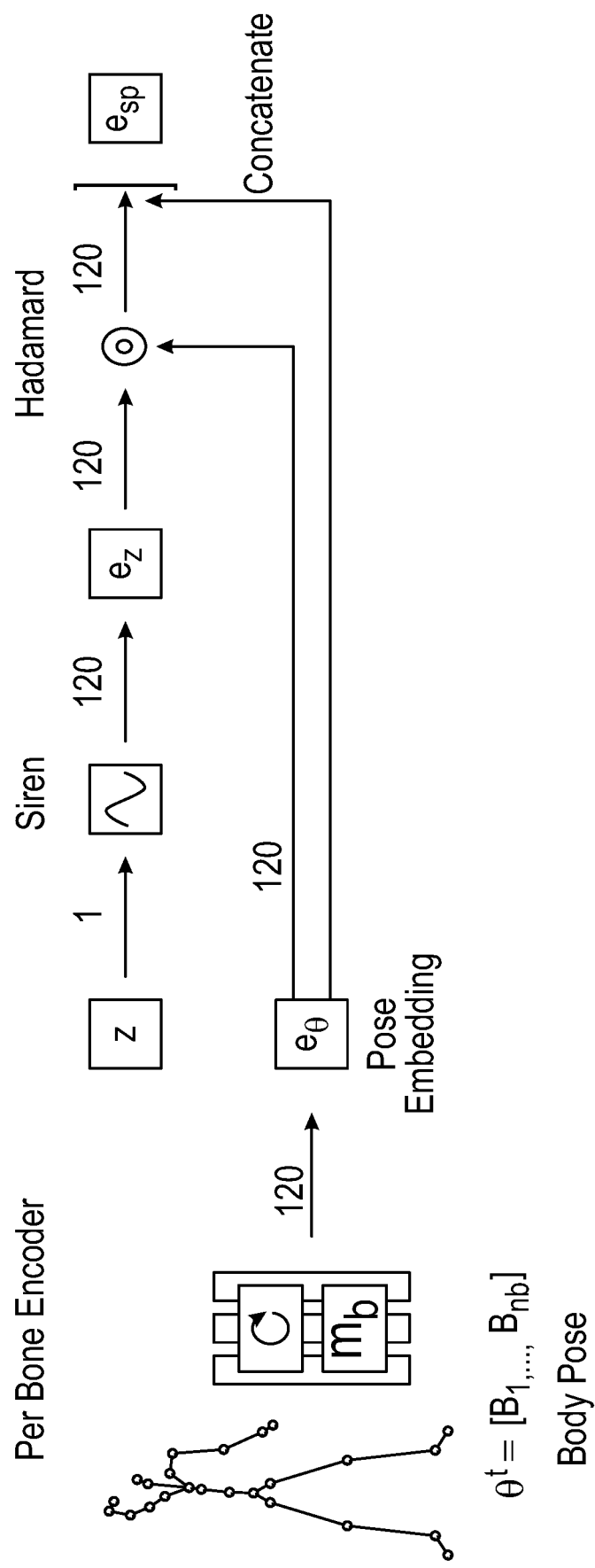
FIG. 3 is an illustration depicting space and pose aware conditioning whereby the body pose is encoded using a per-bone MLP network operating on individual bone transforms in an example configuration.

FIG. 3 is an illustration depicting space and pose aware conditioning $e_{sp}$, whereby the body pose $\theta^t$ is encoded using a per-bone MLP network $m_b$ operating on individual bone transforms in an example configuration. The pose embedding ee is then fused with space embedding (e.g., by SIREN) to generate the pose aware conditioning vector $e_{sp}$ for PIN.

To produce parameters for coupling operations, two MLPs, including translation map mi and rotation map $m_r$, take as input the above conditioning vector $e_{sp}$.

$$[t_x, t_y] = m_t(e_{sp}) : \mathbb{R}^{2d} \to \mathbb{R}^2, \qquad (10)$$

$$\gamma_{xy} = m_r(e_{sp}) : \mathbb{R}^{2d} \to \mathbb{R}^1. \qquad (11)$$

It is noted that the output of $m_r$ only predicts the angle of rotation $\gamma_{xy}$ in radians (a single value). The axis of rotation passes through the origin of the split input space, i.e. XY space in this example. $\gamma_{xy}$ is converted into a rotation matrix $R_{xy}$.

Unlike the 2D coupling layer described above with respect to FIG. 2, the rotation operator cannot be used in 1D. In this case, only translation is used. For layer $G^x([x, y, z], \theta^t)$ with split pattern [x] and [y, z] the coupling operation becomes:

$$x' = x + t_x \text{ and } [y', z'] = [y, z], \qquad (12)$$

where $t_x \in \mathbb{R}^1$ is produced in a similar fashion as a 2D coupling layer using a translation map $m_t: \mathbb{R}^{2d} \to \mathbb{R}^1$ with single scalar output instead of 2D translation. The space embedding of Equation (8), in the 1D case, takes both coordinates as input $e_{xy} = \Phi([x, y]): \mathbb{R}^2 \to \mathbb{R}^d$.

The Pose-conditioned Invertible Network (PIN) may be composed by chaining together multiple 1D and 2D pose-conditioned coupling layers as:

$$H(p, \theta^t) = G_1 \circ G_2 \circ \ldots G_n : \mathbb{R}^3 \to \mathbb{R}^3, \qquad (13)$$

where p represents a point in 3D space, Gi represents a coupling layer, and $\theta^t$ represents pose. Inverting PIN is equivalent to sequentially inverting each coupling layer in the reverse order:

$$H^{-1}(p, \theta^t) = G_n^{-1} \ldots G_2^{-1} \circ G_1^{-1}. \qquad (14)$$

Since the PIN is invertible by construction, it preserves exact correspondences between its input and output spaces:

$$p = H^{-1}(H(p, \theta^t), \theta^t) \, \forall \, p \in \mathbb{R}^3. \qquad (15)$$

A single coupling layer of PIN is visualized in FIG. 2.

Invertible Neural Skinning

Figure 4A:
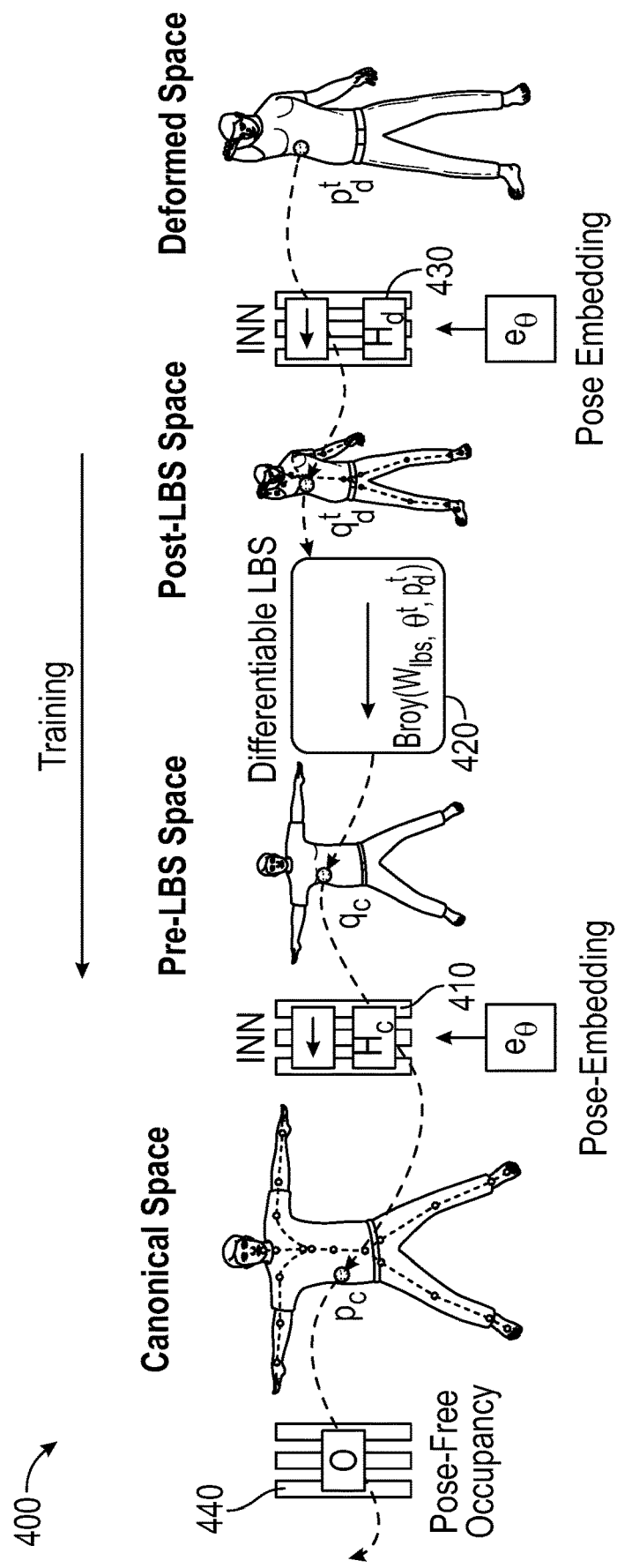
FIG. 4A is an illustration depicting from right to left the training of an Invertible Neural Skinning (INS) pipeline for points in deformed space that are processed to find correspondences in canonical space.
Figure 4B:
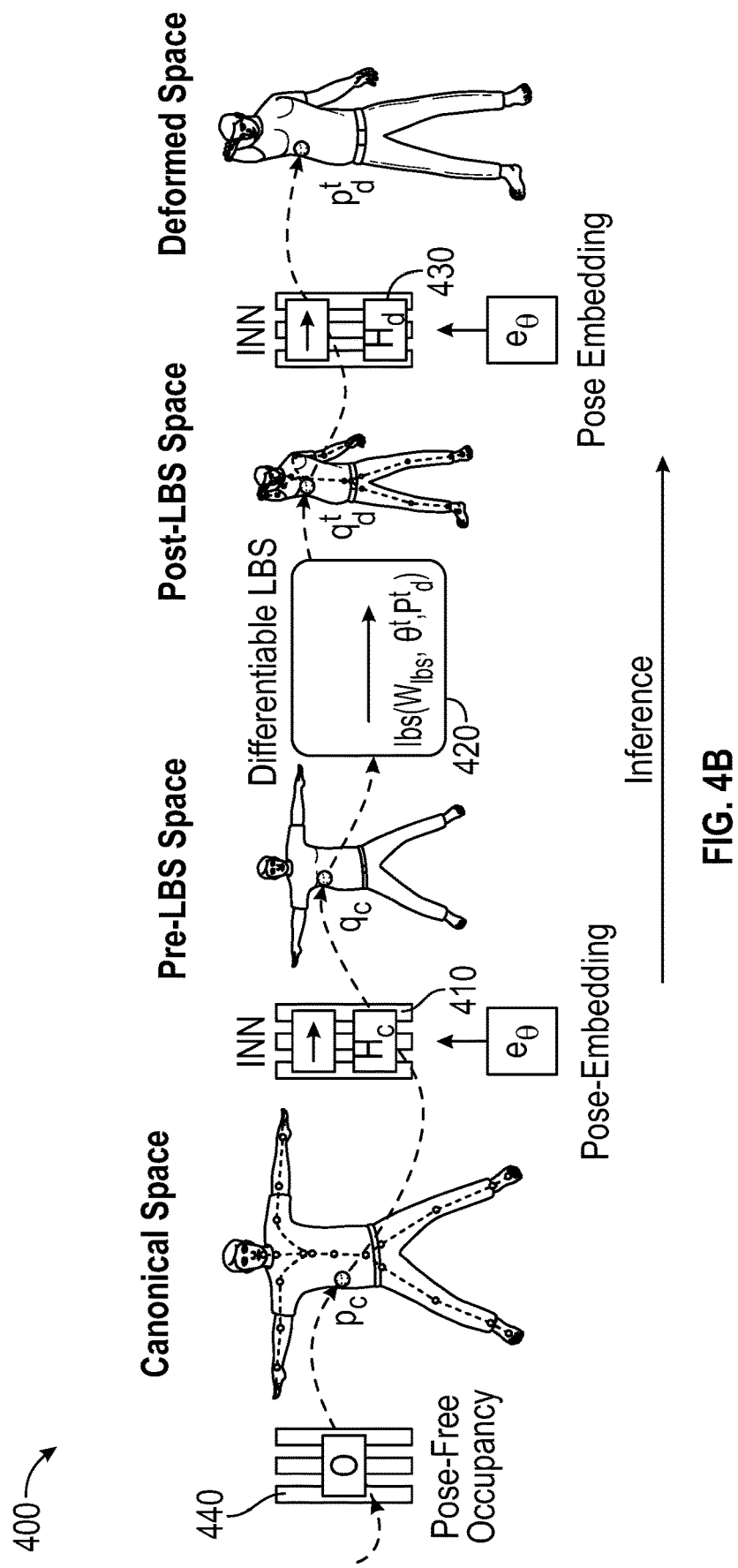
FIG. 4B is an illustration depicting from left to right how characters may be animated using the trained INS pipeline to process given poses using a generic set of bones.

FIGS. 4A and 4B illustrate a posing Invertible Neural Skinning (INS) pipeline 400 that includes three previously described components chained together:

$H_c$: A Pose-conditioned Invertible Network (PIN) $H_c$ 410 that operates after canonical space 100 and before the LBS network 420.

$H_d$: A Pose-conditioned Invertible Network (PIN) 430 that operates before deformed space 110 and after the LBS network 420.

Differentiable LBS network 420 operating between the PINs $H_c$ 410 and $H_d$ 430.

These PINs ($H_c$ and $H_d$) 410 and 430 capture non-linear surface deformations of clothes and attenuate LBS artefacts. As noted above, the canonical representation is not conditioned on the target pose and requires mesh extraction only once.

An invertible mapping that preserves correspondences between deformed spaces 110 and canonical spaces 100 may be formulated as described below.

Deformed to Canonical (Training)

FIG. 4A is an illustration depicting from right to left the training of an Invertible Neural Skinning (INS) pipeline 400 for points in deformed space 110 that are processed to find correspondences in canonical space 100. As illustrated in FIG. 4A from right to left, for a point $p^t_d$ in deformed space 110, the point is processed using PIN $H_d$ 430 to obtain novel poses $q^t_d$ in post-LBS space. Next, Broyden's algorithm is used to get correspondences of $q^t_d$ in canonical space 100, e.g., $\{q^i_c\}^K_{i=1}$. Finally, a second PIN $H_c$ 410 is used to map the correspondences to points $\{p_c\}^K_{i=1}$ in the pose-independent canonical space 100. IN particular:

$$p^t_d \xrightarrow{H_d(.,\theta^t)} q^t_d \xrightarrow{broy(.,\theta^t)} \{q^i_c\} \xrightarrow{H_c(.,\theta^t)} \{p^i_c\}. \qquad (16)$$

To obtain the most suitable canonical correspondence, the arg max is taken over all predicted canonical occupancies:

$$p_c = \underset{i=1\ldots K}{\operatorname{argmax}}\{O(p^i_c)\}. \qquad (17)$$

During training, the arg max is approximated with a softmax function in order to backpropagate gradients softly through all correspondences following SNARF.

In the training dataset, points in deformed space 110 and corresponding ground truth occupancy values of zero or one are provided. These deformed points are mapped to canonical space 100 and binary cross-entropy loss is applied to jointly train all components of the posing network according to:

$$\min_{H_d, H_c, w_{lbs}, O} L_{bce}(O(p_c), o_{gt}). \qquad (18)$$

In addition, following SNARF, a prior may be enforced on the canonical pose by using two additional losses during the first epoch. First, additional points are sampled on bones in canonical pose and their occupancies are encouraged to be one. Second, the skinning weight of bone joints are encouraged to be equal. However, no ground truth skinning weights are required during these steps.

Thus, the train the INS pipeline 400, input scans of humans in different poses in deformed space 110 are provided the PIN $H_d$ 430 to obtain the novel poses $q^t_d$. The differentiable LBS network 420 uses Broyden's algorithm is used to get correspondences $q^i_c$ of $q^t_d$ in canonical space 100. The second PIN $H_c$ 410 maps these correspondences to points $\{p_c\}^K_{i=1}$ in the pose-independent canonical space 100 to train the occupancy network 440.

Canonical to Deformed (Inference)

FIG. 4B is an illustration depicting from left to right, how characters may be animated (e.g., via skeletal bone articulation) using the trained INS pipeline 400 to process given poses using a generic set of bones. As shown in FIG. 4B, once the INS pipeline 400 is trained, characters may be animated using the INS pipeline 400 in any given pose $\theta^n$ in two steps. First, mesh extraction is run on the canonical occupancy network O 440 to obtain the poses $q_c$ in canonical space 100 from canonical points $p_c$. Second, the mesh vertices are reposed using the bones via an inverse pass of the posing INS pipeline 400 as:

$$p_c H_c^{-1}(., \theta^n) q_c \text{lbs}(., \theta^n) q^t_d H_d^{-1}(., \theta^n) p^t_d. \quad (19)$$

Since the canonical occupancy network O 440 is independent of $\theta^n$, the mesh may be extracted exactly once. Reposing this mesh for a sequence of poses becomes equivalent to performing multiple inferences as described in Equation (19).

In an alternative configuration, the occupancy network 440 can be replaced with a neural representation that can handle texture and lightning and thus learn directly from 2D images and videos instead of raw scans.

Thus, during inference by the INS pipeline 400, a given pose $\theta^n$ and a generic set of bones $m_b$ are provided as input. The PIN $H_c$ 410 maps the canonical points $\{p_c\}^K_{i=1}$ in the pose-independent canonical space 100 to the pre-LBS space to get pose correspondences $q^i_c$ of points $p_c$ in canonical space 100. The pose correspondences $q^i_c$ are applied to the differentiable LBS network 420 to correct errors to obtain the novel poses $q^t_d$ in the post-LBS space. The PIN $H_d$ 430 transforms the novel poses $q^t_d$ to points $p^t_d$ in the deformed space 110.

Training Evaluation

Training the INS method uses sampled points in the deformed space 110, along with corresponding occupancies and poses. The INS pipeline 400 was benchmarked on two datasets including CAPE, which features scanned humans in loose clothing, and DFAUST, containing only minimally clothed human scans.

CAPE contains scans of 11 subjects (8 males and 3 females), wearing 8 different types of garments while performing a large number of actions. These actions were recorded using a high-resolution body scanner (3dMD LLC, Atlanta, GA), and the scans were registered using an SMPL model. Similarly to SNARF, the INS pipeline 400 trains a new model every subject-cloth pair. It will be appreciated that exhaustively training on every combination quickly becomes expensive. To manage computational costs, a subset of 15 sequences was used. This subset covers all garment types at least once and most of the subjects, thus capturing variations in both, including body shape and clothing.

DFAUST is a subset of the AMASS dataset consisting of 10 subjects who are minimally clothed. Each subject is scanned similarly to CAPE while performing 10 different actions. As the subjects wear minimal clothing, much of their motions can be represented accurately by rigid body transformations. As a consequence of little subject clothing, DFAUST is observed to contain significantly fewer pose-specific deformations. Thus, the DFAUST dataset is not well-posed to test the true capabilities of the INS pipeline 400.

For a given subject in DFAUST or a subject-clothing pair in CAPE, multiple temporal sequences were provided, each containing a different action. These sequences were divided in a 9:1 ratio into train and test sets. This split is similar to SNARF. Following SNARF, the mean Intersection-over-Union of points sampled near the mesh surface (IoU surface) and of points sampled uniformly in space (IoU bbox) are reported herein.

SNARF was used without pose-conditioning in the canonical occupancy network as the first and primary baseline. For this, the pose-conditioning used by SNARF was removed such that canonical space 100 became pose-independent, i.e. $O(p_c)$. No other changes were made. This setting is comparable to INS as it allows for fast posing and preserves correspondences across different poses.

The INS method was also compared to the original SNARF, which uses a pose-conditioned occupancy network, i.e., $O(p_c, \theta^t)$. However, the above pose-conditioned occupancy comes at the sacrifice of fast posing by requiring expensive mesh extraction for each new pose while not preserving correspondences across them. These disadvantages make the direct comparison between INS and SNARF based solely on their performance a little lopsided.

In addition to the above strong learned baselines, results are provided on two simpler baselines, which use the SMPL-fitted LBS weights to unpose the meshes (scans) using forward skinning. For an average LBS baseline, an average of all the canonicalized training meshes was taken to generate a final canonical mesh and deform it to an unseen given pose using Forward LBS and SMPL weights. A first LBS baseline is similar to the average LBS baseline described and uses SMPL-fitted weight for reposing. Instead of using an average across all training meshes, it only uses the first mesh, thus containing lesser pose-conditioned details.

Results

The results show INS outperforming the state-of-the-art reposing method SNARF. On clothed human data, INS provides an absolute gain of roughly 1% when compared to SNARF with pose-conditioning, and roughly 6% compared to SNARF without pose-conditioning. Experiments conducted on much simpler minimally clothed human data obtained competitive results. INS was found to be an order of magnitude faster at reposing long sequences. The results below also clearly show that INS can correct the LBS artefacts well.

The results of INS on clothed human data (CAPE) are shown in Table 1. Given the challenging nature of modeling cloth deformations contained in this dataset, INS was found to surpass SNARF-NC (without pose-conditioning) on average by +6.24% and +6.41% absolute percentage points in Surface IoU and Bounding Box IoU, respectively. Moreover, INS also outperformed vanilla SNARF with pose-conditioning by +0.89% and +1.02% absolute percentage points in Surface IoU and Bounding Box IoU, respectively, while also enjoying the benefits of fast posing and matched correspondences across various poses. It can be observed that the simple aggregation baseline of average LBS (AVG-LBS) performs quite closely with SNARF-NC with a performance drop of only 1.88% and 1.66% percentage points between them. However, AVG-LBS benefits from using a strong prior of parametric a SMPL model and corresponding fitted weights.

mesh of a clothed character extracted at $128^3$ resolution across 125 different target poses. As illustrated, a single mesh extraction pass with MISE operating on the cube of resolution $128^3$, takes nearly 1.5 seconds. While reposing, SNARF 520 performs this operation for every given pose, whereas INS 510 performs mesh extraction once. Reposing the extracted mesh INS 510 takes 0.13 seconds for an inference pass, which is an order of magnitude faster than SNARF.

TABLE 1

Quantitative Results on Clothed Humans.

| | | IoU Surface | | | | | IoU Bounding Box | | | | |
|---|---|---|---|---|---|---|---|---|---|---|---|
| Subject | Clothing | AVG-LBS | FIRST-LBS | SNARF | SNARF-NC | INS | AVG-LBS | FIRST-LBS | SNARF | SNARF-NC | INS |
| 03375 | blazerlong | 62.63% | 53.91% | 70.16% | 66.1% | 72.83% | 62.57% | 54.05% | 70.24% | 66.11% | 72.69% |
| 00215 | poloshort | 64.91% | 57.27% | 73.1% | 65.68% | 72.22% | 64.92% | 57.55% | 73.1% | 65.8% | 72.35% |
| 00096 | shirtlong | 63.48% | 52.07% | 75.85% | 67.92% | 73.48% | 63.55% | 52.15% | 75.77% | 67.97% | 73.56% |
| 00096 | shirtshort | 59.05% | 54.67% | 75.32% | 63.59% | 74.89% | 59.12% | 54.7% | 75.16% | 63.61% | 74.96% |
| 00096 | jerseyshort | 62.0% | 56.63% | 73.28% | 64.28% | 74.61% | 62.02% | 56.45% | 73.19% | 63.98% | 74.37% |
| 00134 | longlong | 65.98% | 61.5% | 73.96% | 67.65% | 78.97% | 65.91% | 61.45% | 73.96% | 67.73% | 78.93% |
| 03223 | shortshort | 74.74% | 60.66% | 81.42% | 77.56% | 82.63% | 74.81% | 60.67% | 81.33% | 77.66% | 82.76% |
| 03331 | longshort | 70.3% | 65.2% | 77.13% | 75.12% | 77.12% | 70.5% | 65.52% | 77.03% | 74.5% | 77.22% |
| 00127 | shortlong | 73.84% | 65.7% | 72.48% | 70.0% | 73.2% | 74.09% | 65.87% | 72.31% | 69.9% | 73.33% |
| 02474 | longshort | 60.87% | 54.37% | 70.16% | 62.39% | 71.64% | 60.94% | 54.41% | 70.14% | 62.26% | 71.76% |
| 03284 | longshort | 64.68% | 58.5% | 67.04% | 65.76% | 68.79% | 64.68% | 58.21% | 66.87% | 65.44% | 68.77% |
| 00032 | longshort | 64.05% | 59.63% | 69.23% | 64.47% | 69.04% | 64.51% | 59.67% | 69.21% | 64.63% | 69.14% |
| 00122 | shortlong | 56.85% | 45.74% | 64.67% | 60.98% | 64.85% | 57.01% | 45.85% | 64.56% | 60.87% | 65.06% |
| 03394 | longlong | 62.56% | 52.11% | 69.43% | 66.16% | 71.55% | 62.6% | 52.25% | 69.27% | 66.1% | 71.36% |
| 00159 | longshort | 69.27% | 63.22% | 70.31% | 65.64% | 71.1% | 69.52% | 63.76% | 70.35% | 65.19% | 71.58% |
| Average | | 65.01% | 57.41% | 72.24% | 66.89% | 73.13% | 65.12% | 57.5% | 72.17% | 66.78% | 73.19% |

The results of INS on much simpler minimally clothed humans from the DFAUST dataset are shown in Table 2. As illustrated, INS outperformed SNARF-NC (without pose-conditioning) on average by +3.37% and +0.63% absolute percentage points in Surface IoU and Bounding Box IoU metrics, respectively. When compared to SNARF with pose conditioning, INS lagged behind by −1.42% and −0.86% absolute percentage points in Surface IoU and Bounding Box IoU metrics, respectively. Given the minimal clothing and few pose-conditioned non-linear effects in DFAUST, this performance drop can be attributed to SNARF overfitting easily to this benchmark. This result also reflects the importance of testing on many realistic datasets such as CAPE.

TABLE 2

Quantitative Results on Minimally Clothed Humans.

| | IoU Surface | | | IoU Bounding Box | | |
|---|---|---|---|---|---|---|
| Subject | SNARF | SNARF-NC | INS | SNARF | SNARF-NC | INS |
| 50007 | 90.28% | 83.9% | 86.63% | 97.77% | 96.16% | 96.11% |
| 50022 | 92.19% | 88.09% | 92.58% | 98.05% | 96.68% | 98.12% |
| 50026 | 91.13% | 80.54% | 89.26% | 97.67% | 94.37% | 97.13% |
| 50004 | 89.6% | 85.4% | 88.96% | 97.48% | 96.3% | 97.21% |
| 50009 | 87.05% | 83.87% | 85.77% | 95.89% | 94.63% | 93.47% |
| 50021 | 89.76% | 87.26% | 90.46% | 96.79% | 95.58% | 96.95% |
| 50025 | 90.95% | 86.12% | 91.59% | 97.35% | 95.82% | 97.55% |
| 50027 | 89.54% | 86.9% | 85.91% | 96.74% | 95.79% | 93.75% |
| 50002 | 89.25% | 84.41% | 85.98% | 97.55% | 96.67% | 97.02% |
| 50020 | 90.31% | 85.69% | 88.74% | 96.85% | 95.15% | 96.23% |
| Average | 90.01% | 85.22% | 88.59% | 97.21% | 95.72% | 96.35% |

Figure 5:
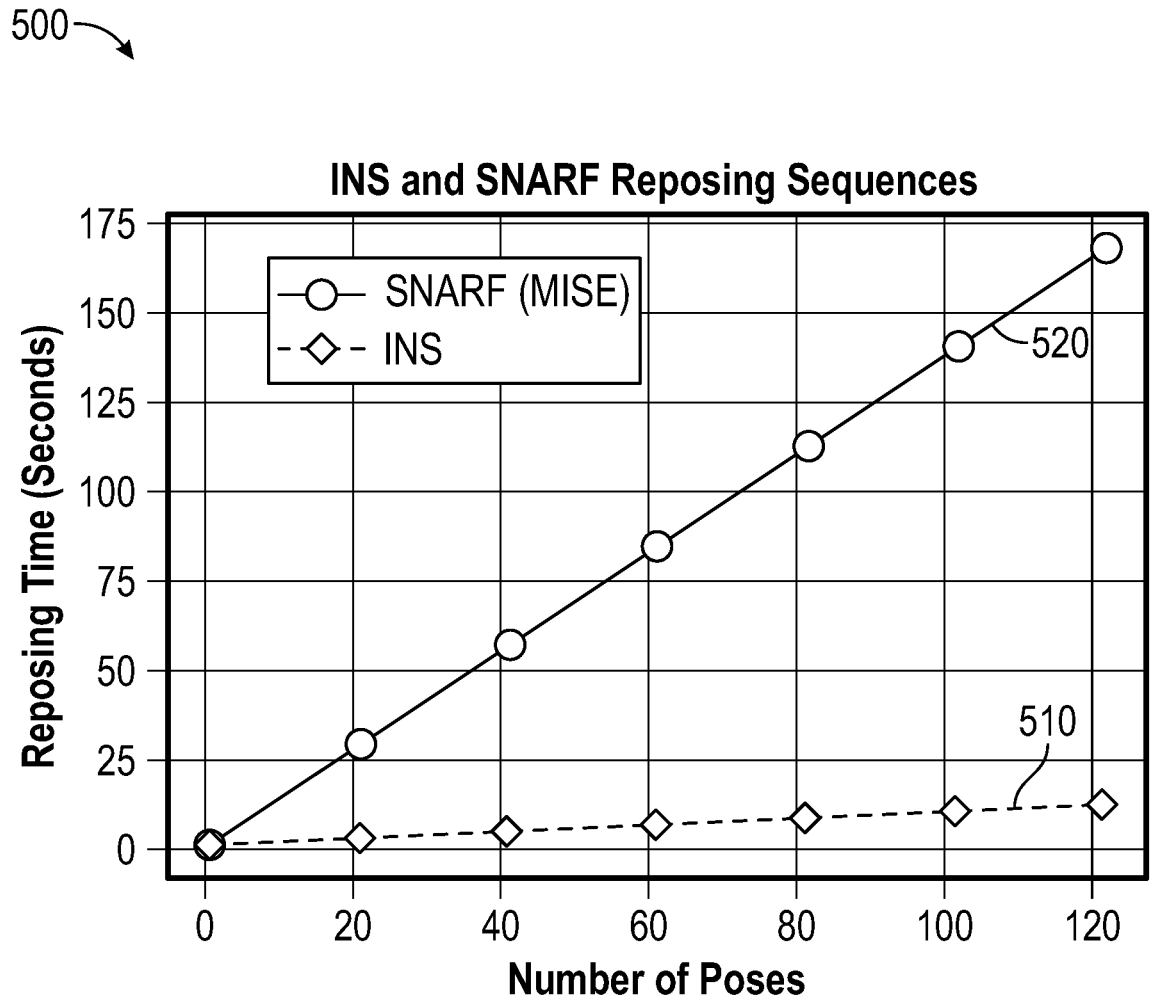
FIG. 5 is a graph illustrating a reposing time comparison between INS and SNARF.

FIG. 5 is a graph 500 illustrating a reposing time comparison between INS 510 and SNARF 520. FIG. 5 shows the time taken by SNARF 520 versus INS 510 for reposing a Ablations Numerous ablations of the INS setup were also performed. The results of the ablations of INS on a clothed subject 03375 (Table 1, Row 1) from the CAPE dataset are summarized in Table 3.

TABLE 3

Ablation Table.

| # Ablation | IoU Surface (%) | IoU Bounding Box(%) |
|---|---|---|
| 1 INS(vanilla) | 72.83 | 72.69 |
| 2 w/o Pose Mul. | $61.94_{-10.89}$ | $62.00_{-10.69}$ |
| 3 w/o SIREN | $69.67_{-3.16}$ | $69.57_{-3.12}$ |
| 4 w/o Rotation | $71.91_{-0.92}$ | $71.87_{-0.82}$ |
| 5 w/o $H_d$ | $72.66_{-0.17}$ | $72.58_{-0.11}$ |
| 6 w/o $H_c$ | $67.89_{-4.94}$ | $67.81_{-4.88}$ |
| 7 w/o LBS | $40.79_{-32.04}$ | $40.65_{-32.04}$ |

The ablations illustrate that multiplying pose and space embeddings is important. Reformulating the pose conditioning by simple concatenation, i.e. $[e_z, e_\theta]$ instead of multiply-then-concatenate, i.e., $[e_z, e_z \odot e_\theta]$ leads to a significant performance drop of ~11% points in both metrics (Row 2 of Table 3).

The ablations also show that invertible networks do not contribute equally to the performance. Removing the canonical space PIN $H_c$ leads to a sharp drop in IoU Surface by 4.94%, when compared to removing the deformed space INN $H_d$ which drops performance by only 0.17% points (Rows 5, 6 of Table 3). $H_c$ contributes much more than $H_d$, which is attributed partly to the fact that editing an LBS-deformed mesh introduces the additional complexity of resolving part-wise correspondences, such as locating the new positions of joints and limbs.

Replacing SIREN positional embedding with MLP may hurt the results. IoU Surface drops by 3.16% if the learned sinusoidal embeddings are replaced by simple MLP layers. This happens as fine surface details such as cloth wrinkles get blurred when using MLP, which is prevented by SIREN.

Also, PINs without rotation may perform slightly worse. Removing 2D operations from the PINs leads to a drop in IoU surface by 0.92%. This happens because twisting deformations in the surface have to be represented by only displacements, which has previously been shown to be difficult to learn.

Simply using PINs without LBS performs worse. Entirely removing the differential LBS module and relying solely on PINs to capture the full articulate motion results in a huge drop of 32% on both metrics (Row 7 of Table 3).

Qualitative Analysis

INS can represent finer details compared to SNARF. SNARF was found to be unable to capture fine details of cloth wrinkles, while also missing fingers. SNARF-NC was found to struggle with LBS artefacts such as volume loss by shrinking an arched back and displaying candy-wrapper effects. INS was found to be able to capture much sharper local details around the body joints, such as around the waist and neck.

PINs can represent pose-varying deformations well. PIN was found to learn to introduce pose-varying deformations such as raising cloth outlines around the neck and shoulder joint, introducing dress wrinkles at near extremities, and even adjusting limbs such as orienting feet.

Conclusion

An invertible, end-to-end differentiable, and trainable pipeline called Invertible Neural Skinning for reposing humans is provided that includes a Pose-conditioned Invertible Network (PIN) that can handle nonlinear surface deformations of clothes and skin well, while also retaining correspondences across different poses. By placing two PINs around a differentiable LBS network and using a pose-free occupancy network, INS was created. INS has been found to outperform previous methods on clothed humans, while staying competitive on simpler and minimally clothed humans. Since reposing with INS requires the expensive mesh extraction exactly once, INS provides a speed-up of an order of magnitude compared to previous methods when animating long pose sequences.

Processing Platform

Figure 6:
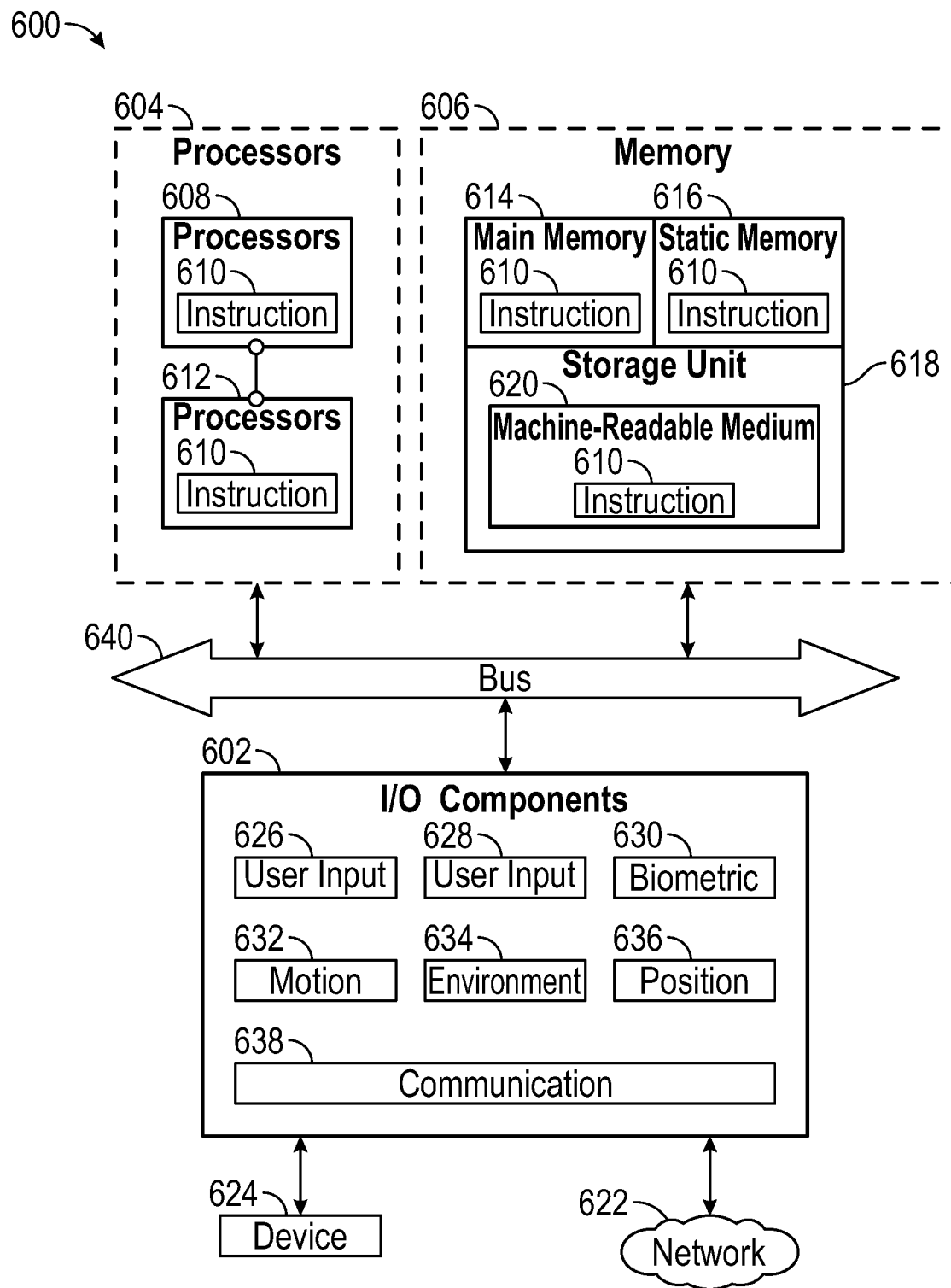
FIG. 6 is a block diagram of a machine within which instructions (e.g., software, a program, an application, an applet, an app, or other executable code) for causing the machine to perform one or more of the methodologies discussed herein may be executed.

FIG. 6 is a diagrammatic representation of the machine 600 within which instructions 610 (e.g., software, a program, an application, an applet, an app, or other executable code) for causing the machine 600 to perform one or more of the methodologies discussed herein may be executed. For example, the instructions 610 may cause the machine 600 to execute one or more of the methods described herein. The instructions 610 transform the general, non-programmed machine 600 into a particular machine 600 programmed to carry out the described and illustrated functions in the manner described. The machine 600 may operate as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may include, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 610, sequentially or otherwise, that specify actions to be taken by the machine 600. Further, while only a single machine 600 is illustrated, the term "machine" shall also be taken to include a collection of machines that individually or jointly execute the instructions 610 to perform one or more of the methodologies discussed herein. The machine 600, for example, may include the INS pipeline 400 of FIGS. 4A and 4B. In some examples, the machine 600 may also include both client and server systems, with certain operations of a particular method or algorithm being performed on the server-side and with certain operations of the particular method or algorithm being performed on the client-side.

The machine 600 may include processors 604, memory 606, and input/output I/O components 602, which may be configured to communicate with each other via a bus 640. In an example, the processors 604 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 608 and a processor 612 that execute the instructions 610. The term "processor" is intended to include multi-core processors that may include two or more independent processors (sometimes referred to as "cores") that may execute instructions contemporaneously. Although FIG. 6 shows multiple processors 604, the machine 600 may include a single processor with a single core, a single processor with multiple cores (e.g., a multi-core processor), multiple processors with a single core, multiple processors with multiples cores, or any combination thereof.

The memory 606 includes a main memory 614, a static memory 616, and a storage unit 618, both accessible to the processors 604 via the bus 640. The main memory 606, the static memory 616, and storage unit 618 store the instructions 610 for one or more of the methodologies or functions described herein. The instructions 610 may also reside, completely or partially, within the main memory 614, within the static memory 616, within machine-readable medium 620 within the storage unit 618, within at least one of the processors 604 (e.g., within the Processor's cache memory), or any suitable combination thereof, during execution thereof by the machine 600.

The I/O components 602 may include a wide variety of components to receive input, provide output, produce output, transmit information, exchange information, capture measurements, and so on. The specific I/O components 602 that are included in a particular machine will depend on the type of machine. For example, portable machines such as mobile phones may include a touch input device or other such input mechanisms, while a headless server machine will likely not include such a touch input device. It will be appreciated that the I/O components 602 may include many other components that are not shown in FIG. 6. In various examples, the I/O components 602 may include user output components 626 and user input components 628. The user output components 626 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 628 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 602 may include biometric components 630, motion components 632, environmental components 634, or position components 636, among a wide array of other components. For example, the biometric components 630 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 632 include acceleration sensor components (e.g., accelerometer), gravitation sensor components, rotation sensor components (e.g., gyroscope).

The environmental components 634 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

The position components 636 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 602 further include communication components 638 operable to couple the machine 600 to a network 622 or devices 624 via respective coupling or connections. For example, the communication components 638 may include a network interface Component or another suitable device to interface with the network 622. In further examples, the communication components 638 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 624 may be another machine or any of a wide variety of peripheral devices (e.g., a peripheral device coupled via a USB).

Moreover, the communication components 638 may detect identifiers or include components operable to detect identifiers. For example, the communication components 638 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 638, such as location via Internet Protocol (IP) geolocation, location via Wi-Fi® signal triangulation, location via detecting an NFC beacon signal that may indicate a particular location, and so forth.

The various memories (e.g., main memory 614, static memory 616, and memory of the processors 604) and storage unit 618 may store one or more sets of instructions and data structures (e.g., software) embodying or used by one or more of the methodologies or functions described herein. These instructions (e.g., the instructions 610), when executed by processors 604, cause various operations to implement the disclosed examples.

The instructions 610 may be transmitted or received over the network 622, using a transmission medium, via a network interface device (e.g., a network interface component included in the communication components 638) and using any one of several well-known transfer protocols (e.g., hypertext transfer protocol (HTTP)). Similarly, the instructions 610 may be transmitted or received using a transmission medium via a coupling (e.g., a peer-to-peer coupling) to the devices 624.

Figure 7:
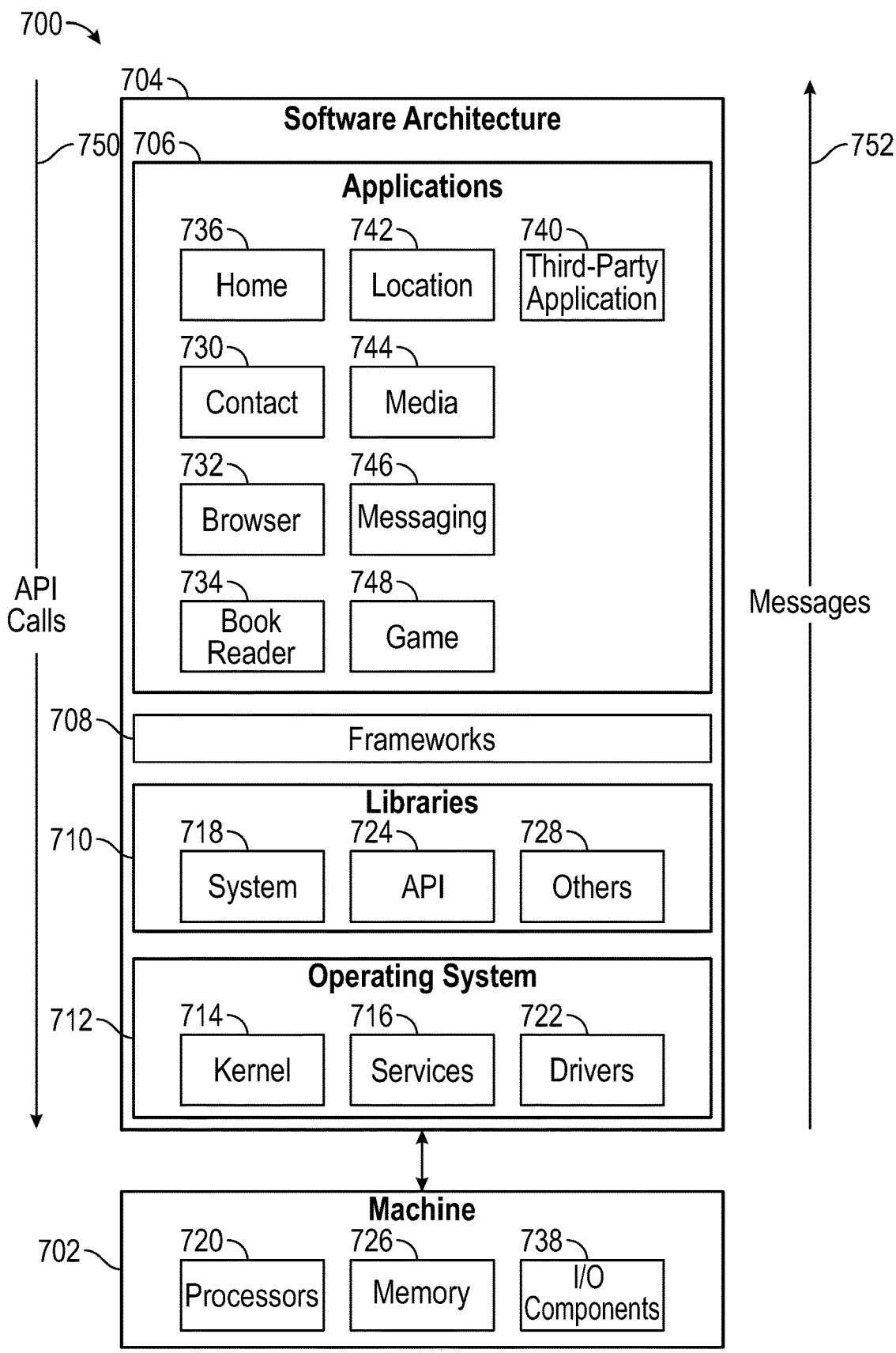
FIG. 7 is a block diagram showing a software architecture within which examples described herein may be implemented.

FIG. 7 is a block diagram 700 illustrating a software architecture 704, which can be installed on one or more of the devices described herein. The software architecture 704 is supported by hardware such as a machine 702 (see FIG. 6) that includes processors 720, memory 726, and I/O components 738. In this example, the software architecture 704 can be conceptualized as a stack of layers, where each layer provides a particular functionality. The software architecture 704 includes layers such as an operating system 712, libraries 710, frameworks 708, and applications 706. Operationally, the applications 706 invoke API calls 750 through the software stack and receive messages 752 in response to the API calls 750.

The operating system 712 manages hardware resources and provides common services. The operating system 712 includes, for example, a kernel 714, services 716, and drivers 722. The kernel 714 acts as an abstraction layer between the hardware and the other software layers. For example, the kernel 714 provides memory management, processor management (e.g., scheduling), component management, networking, and security settings, among other functionality. The services 716 can provide other common services for the other software layers. The drivers 722 are responsible for controlling or interfacing with the underlying hardware. For instance, the drivers 722 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 710 provide a common low-level infrastructure used by the applications 706. The libraries 710 can include system libraries 718 (e.g., C standard library) that provide functions such as memory allocation functions, string manipulation functions, mathematic functions, and the like. In addition, the libraries 710 can include API libraries 724 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 710 can also include a wide variety of other libraries 728 to provide many other APIs to the applications 706.

The frameworks 708 provide a common high-level infrastructure that is used by the applications 706. For example, the frameworks 708 provide various graphical user interface (GUI) functions, high-level resource management, and high-level location services. The frameworks 708 can provide a broad spectrum of other APIs that can be used by the applications 706, some of which may be specific to a particular operating system or platform.

In an example, the applications 706 may include a home application 736, a contacts application 730, a browser application 732, a book reader application 734, a location application 742, a media application 744, a messaging application 746, a game application 748, and a broad assortment of other applications such as a third-party application 740. The applications 706 are programs that execute functions defined in the programs. Various programming languages can be employed to generate one or more of the applications 706, structured in a variety of manners, such as object-oriented programming languages (e.g., Objective-C, Java, or C++) or procedural programming languages (e.g., C or assembly language). In a specific example, the third-party application 740 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 740 can invoke the API calls 750 provided by the operating system 712 to facilitate functionality described herein.

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component includes a general-purpose processor configured by software to become a special-purpose processor, the general-purpose processor may be configured as respectively different special-purpose processors (e.g., including different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors.

Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. An invertible neural skinning (INS) pipeline for animating a three-dimensional (3D) mesh of a deformable object, comprising:
   a first trained Pose-conditioned Invertible Neural Network (PIN) that obtains novel poses of the deformable object in a pose-dependent canonical space from a given pose of the deformable object defined by a generic set of bones and the 3D mesh, wherein the first trained PIN comprises an invertible transformation algorithm that provides the novel poses of the deformable object in the pose-dependent canonical space from the given pose provided as input during training;
   a differentiable Linear Blend Skinning (LBS) neural network that transforms points in the pose-dependent canonical space to deformed points in novel poses of the deformable object;
   a second trained PIN that maps canonical points of the deformable object in the pose-dependent canonical space to canonical points in a pose-independent canonical space; and a canonical occupancy network or a neural network that receives the canonical points of the deformable object in the pose-independent canonical space, wherein the given pose of the deformable object is animated, via skeletal bone articulation with the generic set of bones, by extracting a mesh of the deformable object from the canonical occupancy network or the neural network to obtain poses of the deformable object in pose-independent canonical space and reposing mesh vertices of the extracted mesh of the deformable object using the generic set of bones via an inverse pass of the INS pipeline, whereby canonical points in the pose-independent canonical space are mapped by the second trained PIN to pose correspondences of points in pose-dependent canonical space that are applied to the trained differentiable LBS neural network to obtain novel poses of the deformable object that are transformed by the first trained PIN for display as an animated deformable object.

2. The INS pipeline of claim 1, wherein the first and second PINS are invertible to preserve exact correspondences between inputs and outputs, and the first and second PINS each comprise one-dimensional (1D) and two-dimensional (2D) pose-conditioned coupling layers of an invertible neural network (INN) that are chained together.

3. The INS pipeline of claim 1, wherein second trained PIN encodes every bone transform in the given pose of the deformable object using an operation map that takes a six-dimensional (6D) input of concatenated three-dimensional (3D) translation and rotation, and obtains pose embedding by concatenating outputs of each bone.

4. A method of animating a three-dimensional (3D) mesh of a deformable object using an invertible neural skinning (INS) pipeline, comprising:

training, by a computer, a first Pose-conditioned Invertible Neural Network (PIN) based on input data including a given pose of the deformable object defined by a generic set of bones and the 3D mesh and an invertible transformation algorithm to generate a first trained PIN for obtaining novel poses of the deformable object in a pose-dependent canonical space;

training, by the computer, a differentiable Linear Blend Skinning (LBS) neural network to transform points in the pose-dependent canonical space to deformed points in novel poses of the deformable object to generate a trained differentiable LBS neural network; and training, by the computer, a second PIN to map canonical points of the deformable object in the pose-dependent canonical space to canonical points in a pose-independent canonical space to generate a second trained PIN;

passing the canonical points of the deformable object in the pose-independent canonical space to a canonical occupancy network or a neural network; and animating, via skeletal bone articulation, the given pose of the deformable object with the generic set of bones by extracting a mesh of the deformable object from the canonical occupancy network or the neural network to obtain poses of the deformable object in pose-independent canonical space and reposing mesh vertices of the extracted mesh of the deformable object using the generic set of bones via an inverse pass of the INS pipeline, whereby canonical points in the pose-independent canonical space are mapped by the second trained PIN to pose correspondences of points in pose-dependent canonical space that are applied to the trained differentiable LBS neural network to obtain novel poses of the deformable object that are transformed by the first trained PIN for display as an animated deformable object.

5. The method of claim 4, further comprising chaining together one-dimensional (1D) and two-dimensional (2D) pose-conditioned coupling layers of an invertible neural network (INN) to form the first and second trained PINS, wherein the first and second trained PINS are invertible to preserve exact correspondences between inputs and outputs.

6. The method of claim 4, further comprising encoding every bone transform in the given pose of the deformable object using an operation map that takes a six-dimensional (6D) input of concatenated three-dimensional (3D) translation and rotation, and obtaining pose embedding by concatenating outputs of each bone.

7. A non-transitory computer-readable storage medium, the computer-readable storage medium including instructions that when executed by a processor cause the processor to animate a three-dimensional (3D) mesh of a deformable object using an invertible neural skinning (INS) pipeline comprising a first Pose-conditioned Invertible Neural Network (PIN), a differentiable Linear Blend Skinning (LBS) neural network, and a second PIN, by performing operations comprising:

training the first PIN based on input date including a given pose of the deformable object defined by a generic set of bones as input and the 3D mesh and an invertible transformation algorithm to generate a first trained PIN for obtaining novel poses of the deformable object in a pose-dependent canonical space;

training the differentiable LBS neural network to transform points in the pose-dependent canonical space to deformed points in novel poses of the deformable object to generate a trained differentiable LBS neural network;

training the second PIN to map canonical points of the deformable object in the pose-dependent canonical space to canonical points in a pose-independent canonical space to generate a second trained PIN;

passing the canonical points of the deformable object in the pose-independent canonical space to a canonical occupancy network or a neural network; and animating, via skeletal bone articulation, the given pose of the deformable object with the generic set of bones by extracting a mesh of the deformable object from the canonical occupancy network or the neural network to obtain poses of the deformable object in pose-independent canonical space and reposing mesh vertices of the extracted mesh of the deformable object using the generic set of bones via an inverse pass of the INS pipeline, whereby canonical points in the pose-independent canonical space are mapped by the second trained PIN to pose correspondences of points in pose-dependent canonical space that are applied to the trained differentiable LBS neural network to obtain novel poses of the deformable object that are transformed by the first trained PIN for display as an animated deformable object.

8. The medium of claim 7, further comprising instructions that when executed by the processor cause the processor to perform operations including encoding every bone transform in the given pose of the deformable object using an operation map that takes a six-dimensional (6D) input of concatenated three-dimensional (3D) translation and rotation, and obtaining pose embedding by concatenating outputs of each bone.

9. The medium of claim 7, further comprising instructions that when executed by the processor cause the processor to perform operations including chaining together one-dimensional (1D) and two-dimensional (2D) pose-conditioned coupling layers of an invertible neural network (INN) to form the first and second PINS, wherein the first and second PINS are invertible to preserve exact correspondences between inputs and outputs.

* * * * *